(12) United States Patent
Michel et al.

(10) Patent No.: US 10,372,434 B1
(45) Date of Patent: Aug. 6, 2019

(54) APPARATUS, COMPUTER PROGRAM, AND METHOD FOR COMMUNICATING AN UPDATE TO A SUBSET OF DEVICES

(71) Applicant: Amdocs Development Limited, Limassol (CY)

(72) Inventors: Christophe Regis Jean-Jacques Michel, Chantepie (FR); Pierre-Erwann Gouesbet, Longaulnay (FR); Jean-François Pierre Marie Greffier, Rennes (FR)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 171 days.

(21) Appl. No.: 15/217,895

(22) Filed: Jul. 22, 2016

(51) Int. Cl.
G06F 9/44 (2018.01)
G06F 8/65 (2018.01)
G06F 11/36 (2006.01)

(52) U.S. Cl.
CPC ............ *G06F 8/65* (2013.01); *G06F 11/3668* (2013.01)

(58) Field of Classification Search
CPC ....................................................... G06F 9/44
USPC ................................................ 717/168–178
See application file for complete search history.

(56) References Cited

U.S. PATENT DOCUMENTS

| | | | |
|---|---|---|---|
| 7,117,355 B2 | 10/2006 | Zomaya et al. | |
| 7,530,065 B1 | 5/2009 | Ciudad et al. | |
| 7,551,922 B2 * | 6/2009 | Roskowski | H04W 24/00 455/226.1 |
| 8,792,934 B2 | 7/2014 | Cupala et al. | |
| 2005/0114362 A1 * | 5/2005 | Colleran | G06F 8/61 |
| 2005/0132179 A1 * | 6/2005 | Glaum | G06F 8/658 713/1 |
| 2005/0223171 A1 * | 10/2005 | Kanai | G06F 3/061 711/114 |
| 2005/0229171 A1 * | 10/2005 | Henry | G06F 21/572 717/168 |
| 2006/0075001 A1 * | 4/2006 | Canning | G06F 8/65 |
| 2008/0250323 A1 * | 10/2008 | Huff | G06F 9/453 715/733 |
| 2009/0089030 A1 * | 4/2009 | Sturrock | G05B 17/02 703/7 |
| 2010/0115259 A1 * | 5/2010 | Elsila | G06F 1/3203 713/100 |
| 2011/0154109 A1 * | 6/2011 | Levine | G06F 8/70 714/26 |
| 2013/0174128 A1 * | 7/2013 | Kansal | G06F 11/3062 717/135 |

(Continued)

FOREIGN PATENT DOCUMENTS

| | | |
|---|---|---|
| EP | 1566731 A1 | 8/2005 |
| WO | 2008008880 A2 | 1/2008 |

(Continued)

*Primary Examiner* — Jae U Jeon
(74) *Attorney, Agent, or Firm* — Zilka-Kotab, P.C.

(57) ABSTRACT

An apparatus, computer program, and method are provided for communicating an update to a subset of devices. In operation, information is received in association with a plurality of devices that have at least one application installed thereon. Further, an update for the at least one application is identified. Still yet, a subset of the plurality of devices is determined, based on the information. Such update for the at least one application is communicated to the subset of the plurality of devices.

6 Claims, 8 Drawing Sheets

(56) References Cited

U.S. PATENT DOCUMENTS

| | | | |
|---|---|---|---|
| 2014/0047115 A1* | 2/2014 | Lipscomb | G06F 9/485 709/226 |
| 2014/0173362 A1* | 6/2014 | Kaiser | G06F 8/65 714/47.2 |
| 2014/0173577 A1 | 6/2014 | Mitchell et al. | |
| 2014/0195297 A1 | 7/2014 | Abuelsaad et al. | |
| 2015/0372859 A1* | 12/2015 | Agrawal | H04L 41/082 709/220 |
| 2016/0078059 A1* | 3/2016 | Kang | H04N 21/23418 382/305 |
| 2016/0078593 A1* | 3/2016 | Mesguich Havilio | G06T 3/40 345/668 |
| 2016/0292065 A1* | 10/2016 | Thangamani | G06F 8/65 |
| 2016/0292085 A1* | 10/2016 | Axnix | G06F 21/575 |
| 2017/0097831 A1* | 4/2017 | Gopshtein | G06F 9/4443 |

FOREIGN PATENT DOCUMENTS

| | | | |
|---|---|---|---|
| WO | 2012023750 A2 | 2/2012 | |
| WO | 2012062632 A1 | 5/2012 | |

* cited by examiner

500

| DEVICE SUPPORTED? | SCREEN SIZE SUPPORTED? | OS SUPPORTED? | USER CONFIGURATIONS SUPPORTED? | UPDATE DEPLOYED? | USER EXPERIENCE IMPACT? |
|---|---|---|---|---|---|
| Yes | Yes | Yes | Yes | Yes | Improved |
| Yes | Yes | Yes | No | No | Stable |
| Yes | Yes | No | Yes | No | Stable |
| Yes | Yes | No | No | No | Stable |
| Yes | No | Yes | Yes | No | Stable |
| Yes | No | Yes | No | No | Stable |
| Yes | No | No | Yes | No | Stable |
| Yes | No | No | No | No | Stable |
| No | Yes | Yes | Yes | No | Stable |
| No | Yes | Yes | No | No | Stable |
| No | Yes | No | Yes | No | Stable |
| No | Yes | No | No | No | Stable |
| No | No | Yes | Yes | No | Stable |
| No | No | Yes | No | No | Stable |
| No | No | No | Yes | No | Stable |
| No | No | No | No | No | Stable |

APPARATUS, COMPUTER PROGRAM, AND METHOD FOR COMMUNICATING AN UPDATE TO A SUBSET OF DEVICES

FIELD OF THE INVENTION

The present invention relates to software update systems, and more particularly to more intelligently distributing software updates.

BACKGROUND

Applications are installed on a continuously increasing set of devices including, but not limited to smartphones, tablets, laptops, televisions, cars, watches, etc. As a consequence, those applications must be continuously updated to best accommodate all of such heterogeneous devices, including new devices emerging on the market, in order to offer an adapted and optimal user experience, as well as obtain a high level of adoption. Unfortunately, such updates may actually alter a user experience on some devices, by introducing unexpected side-effects, due to the wide variety of characteristics of those devices [e.g. hardware, screen size, operating system (including version), application program interfaces (APIs), network conditions, etc.]. This forces developers and testers to validate a huge and still growing range of devices before every deployment, without any information on aspects of the devices which are currently impacted or even a list of devices, and their characteristics, which are in use by end-users of the application.

For example, one widely-adopted update strategy currently consists of publishing all application updates to all targeted devices, including devices in which the code of the application is defined to not activate a corresponding relevant function. This introduces unnecessary risk by propagating side-effects on devices in which it makes no positive impact, or even devices that were better supported before the update was provided.

SUMMARY

An apparatus, computer program, and method are provided for communicating an update to a subset of devices. In operation, information is received in association with a plurality of devices that have at least one application installed thereon. Further, an update for the at least one application is identified. Still yet, a subset of the plurality of devices is determined, based on the information. Such update for the at least one application is then communicated to the subset of the plurality of devices.

BRIEF DESCRIPTION OF THE DRAWINGS

FIG. 5 illustrates a table showing exemplary logic for determining a subset of devices to receive an update, in accordance with one embodiment.

DETAILED DESCRIPTION

Figure 1:
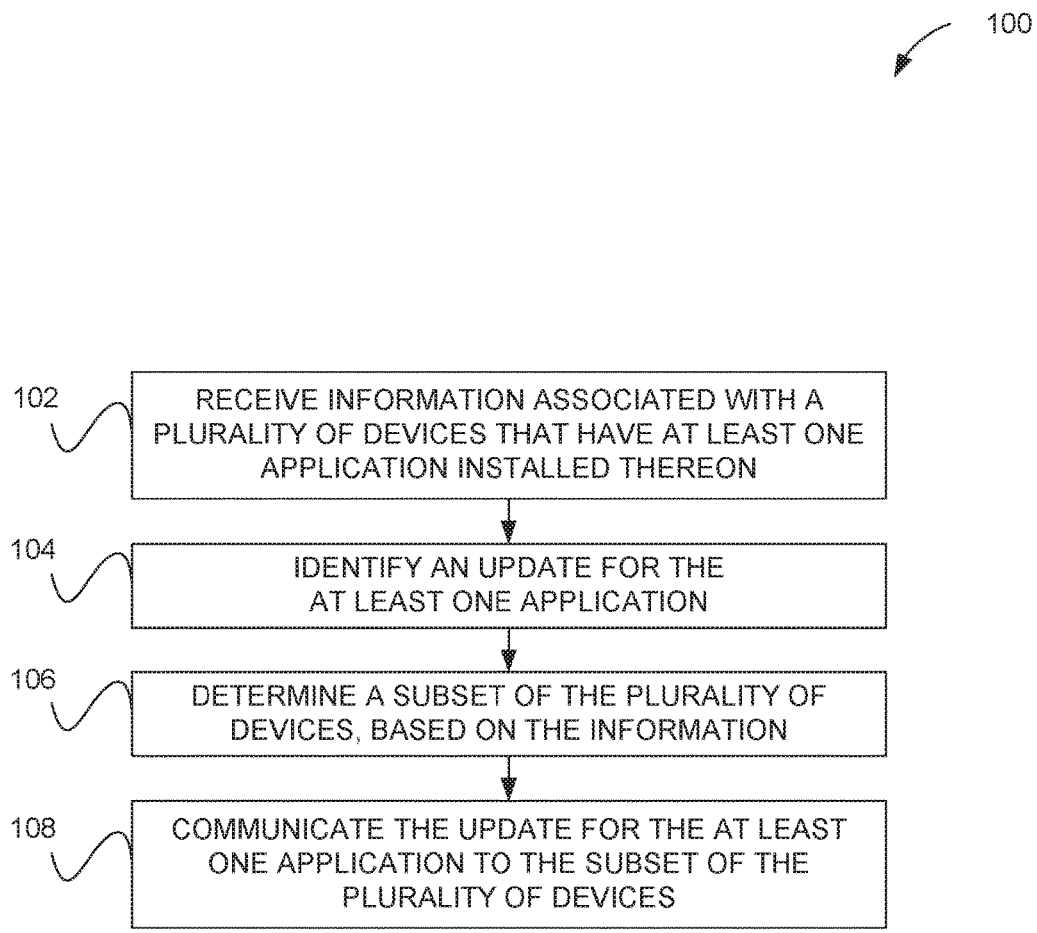
FIG. 1 illustrates a method for communicating an update to a subset of devices, in accordance with one embodiment.

FIG. 1 illustrates a method 100 for communicating an update to a subset of devices, in accordance with one embodiment. In the context of the present description, such devices may include a mobile device (e.g. phone, personal digital assistant (PDA), laptop, tablet, vehicle, wearable such as a watch, etc.), a personal computer, a server, and/or any other device that is capable of receiving updates. Also in the present description, the update may refer to any software, script, or code that is capable of being used to update an application installed on a device. In one embodiment, such update may include code for providing application fixes, functional or user interface (e.g. lay outing, etc.) updates, etc. In other embodiments, such update may include code for extending services provided by the application with additional new features, where such services may apply only to a specific range of devices defined by their screen size, operating system (OS), OS version, and/or other characteristics.

As shown in FIG. 1, information is received in association with a plurality of devices that have at least one application installed thereon, as indicated in operation 102. In the context of the present description, the at least one application may include any software that is capable of being installed on a device. For example, in various embodiments, the application(s) may include, but is not limited to a word processor, a spreadsheet processor, a communication (e.g. email, instant message, etc.) manager, an Internet browser, a file manager, an on-line store application, a client for a network-based application/service, etc.

Further, the information may refer to any data associated with any aspect of the device. In various embodiments, such information may be received over a network (e.g. via a data collection agent, etc.), received via manual input, and/or received in any other way that enables the use thereof.

For example, in one embodiment, the information may relate to hardware of the plurality of devices. Such hardware of the plurality of devices may include a processor, a display, an input device, and/or a network connection, for instance. In another embodiment, the information may relate to software of the plurality of devices. For example, such software of the plurality of devices may include an operating system, and/or an application program interface (API).

In yet another embodiment, the information may relate to the at least one application installed on the plurality of devices. For example, such information may relate to a user usage of one or more aspects of the at least one application. Further, the information may relate to a user experience in connection with the at least one application. For instance, the foregoing user experience may involve one or more complications involving the user experience of the at least one application. Still yet, the information may relate to one or more configuration settings of the at least one application.

With continuing reference to FIG. 1, an update for the at least one application is identified. See operation 104. For example, in one embodiment, the update for the at least one application may be identified in connection with a process for preparing to distribute the update. Of course, the update for the at least one application may be identified in connection with any process that precedes the distribution thereof. While the update may be developed at any time and using any desired resources (or none), the update (or another additional update) to the at least one application may be developed, utilizing the information.

A subset of the plurality of devices is determined in operation 106, based on the information. In the context of the present description, such subset of the devices may include any portion (and only such portion) of the full set of devices that is determined as a function of the information received in operation 102. In various embodiments, such subset of the devices may be determined (utilizing the information) for the purpose of ensuring that only those devices that exhibit certain characteristics receive the update. This may, in turn, ensure that, upon distribution, the update to the at least one application provides one or more benefits which outweigh and/or are not overshadowed by one or more detriments.

Strictly as an option, the update to the at least one application may also be simulated. In one embodiment, such simulation may be used to more intelligently determine the subset of devices that should receive the update. To this end, the subset of the plurality of devices may be determined (in operation 106), based on the simulation. In one embodiment, the simulation may be carried out in response to the receipt of the information and may be further based on the information. Still yet, in other embodiments, the simulation may be carried out prior to the receipt of the information. Even still, the simulation may be updated in response to an introduction of additional devices that have the at least one application installed thereon, where the additional devices include one or more additional features not included in the plurality of devices. More information will be set forth regarding such simulation will be set forth during the description of subsequent embodiments.

Thus, the update for the at least one application is communicated in operation 108 to the subset of the plurality of devices. Such communication may be in- or out of-band, and may be accomplished in any desired manner. For example, the update may be communicated to at least one agent installed on the subset of (or all of) the plurality of devices, where the aforementioned information may be received from the at least one agent, as well.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

Figure 2:
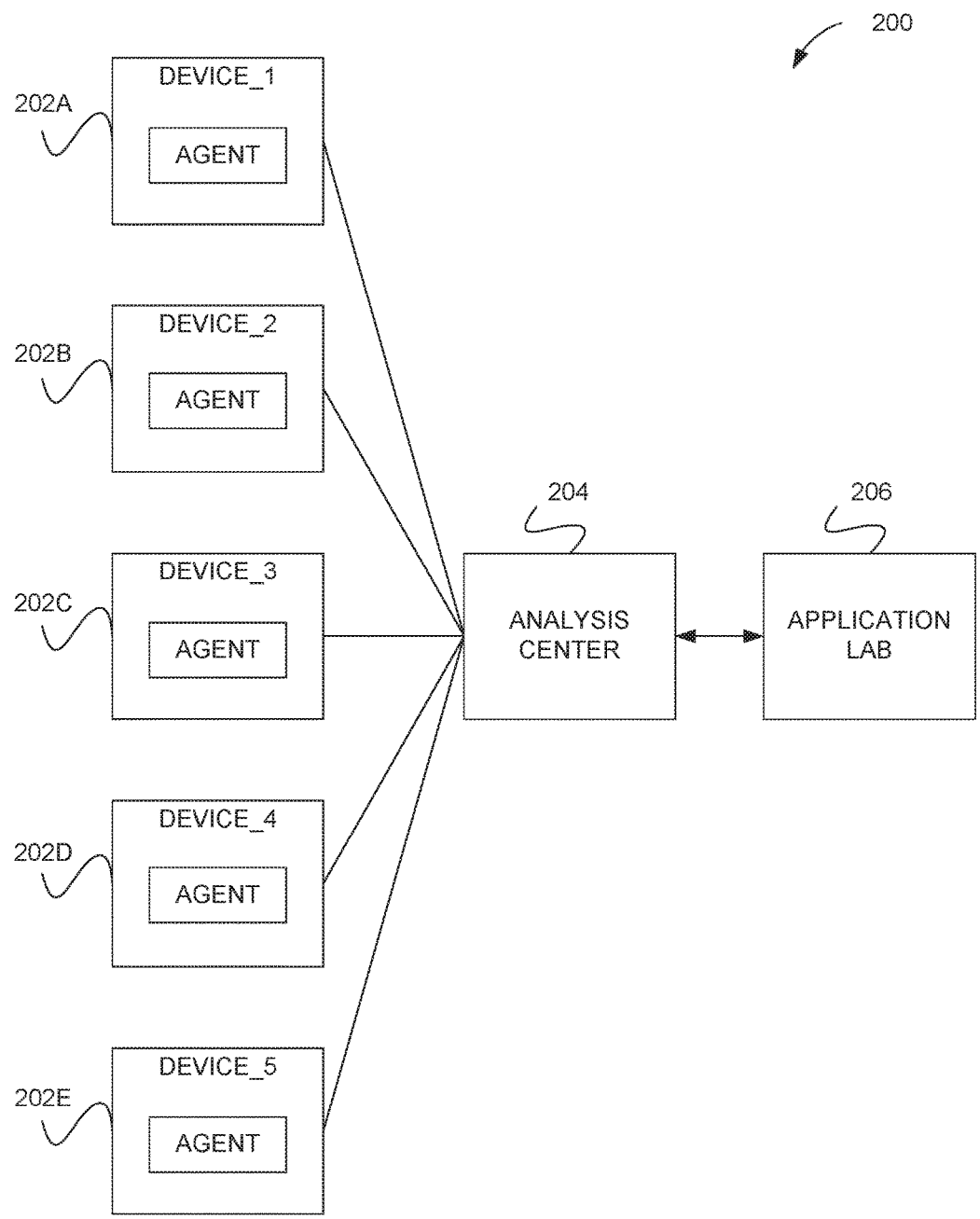
FIG. 2 illustrates a system for communicating an update to a subset of devices, in accordance with one embodiment.

FIG. 2 illustrates a system 200 for communicating an update to a subset of devices, in accordance with one embodiment. As an option, the system 200 may be implemented in the context of any one or more of the embodiments set forth in any previous and/or subsequent figure(s) and/or description thereof. However, it is to be appreciated that the system 200 may be implemented in the context of any desired environment.

As shown, included is a plurality of devices 202A-E each with a data collection agent installed thereon that are capable of communicating with an analysis center 204 that is, in turn, capable of communicating with an application lab 206. In use, the data collection agent of each of devices 202A-E may collect information about device characteristics and application usage in connection with the devices 202A-E and/or any application (not shown) installed thereon. In one embodiment, the agent may comprise of a built-in element of the application or it may include an agent installed separately to collect the aforementioned information of a group of one or more applications installed on the devices 202A-E.

In various embodiments, the agent may collect relevant information from the devices 202A-E, end-user configuration settings, and/or application usage patterns. Still yet, such collected information may be relevant for a specific update applicability, so it can be used to provision application updates to relevant target devices. Table 1 illustrates various additional information that may or may not be collected, as desired.

TABLE 1 information on devices and application configuration
information on end-user activities within the application
information on a user experience with the application including, but not limited to system errors, disconnections, internal errors, instability, and/or user reports
information on current application content (e.g. version and updates installed)

In use, the agent on the devices 202A-E serves to communicate (e.g. transmit, etc.) the collected information to the data analysis center 204.

Thus, the collected information, eventually provided by each agent installed on the different devices 202A-E, is gathered at the data analysis center 204, which performs end-user usage analysis. In various embodiments, the application provider may manually analyze or use automatic algorithms defined by the data analysis center 204 to produce various valuable outputs from the information gathered. For example, the data analysis center 204 may define application update applicability criteria for each individual instance (e.g. end-user and device) of the application, and future usage patterns and/or future device characteristics. Still yet, a map may be provided of updated devices and end-users, in order to check a scope of relevance of the set criteria for an update.

As an option, the application lab 206 may be used in defining the foregoing application update applicability criteria. While the data analysis center 204 and the application lab 206 are shown to be separate components of the present system 200, it should be noted that other embodiments are contemplated where such components are integrated to any desired extent. Since the application(s) installed on the devices 202A-E may have different patterns of code (e.g. versions and updates deployed) for different end-users, based on previous deployments, the application lab 206 may be used in connection with the development and testing of the application(s) and/or update(s) thereof. For example, the application lab 206 may be used to develop and verify applications/updates before releasing the same to the devices 202A-E.

In such role, the application lab 206 may simulate different devices and configurations for all application patterns (e.g. versions and updates) which exist for real end-users. In one embodiment, this may be accomplished by setting an actual or virtual device with a first set of parameters, installing the update, and monitoring device behavior, and then repeating the foregoing process for each and every combination of relevant parameters. By simulating each and every combination of parameters, the application lab 206 may more expeditiously check whether a particular devices 202A-E should receive an update, in response to receiving the information from the relevant agent(s).

On the other hand, in other embodiments, the simulation may be performed in response to the receipt of the information from the relevant agent(s). While such embodiment may incorporate some delay into the process of determining the suitable set of devices 202A-E to receive an update (since simulation would occur only after receiving the information), less processing may be required since the simulation need not necessarily be performed for every single combination of the parameters (since such scenario is unlikely to exist in the system 200 of finite size).

Thus, one possible use of the application lab 206 involves a testing of an update against all settings of devices and types of usage for which the update is required and which exist in real life. Further, a secondary use of the application lab 206 may involve future application/update development to be tested against the current application patterns which the selective deployment produced over time. Still yet, an additional secondary use of the application lab 206 may be to allow architects and business to experience firsthand a real end-user experience of an application, thus providing inspiration for new capabilities and demonstrating current application limits which may be enhanced.

Figure 3:
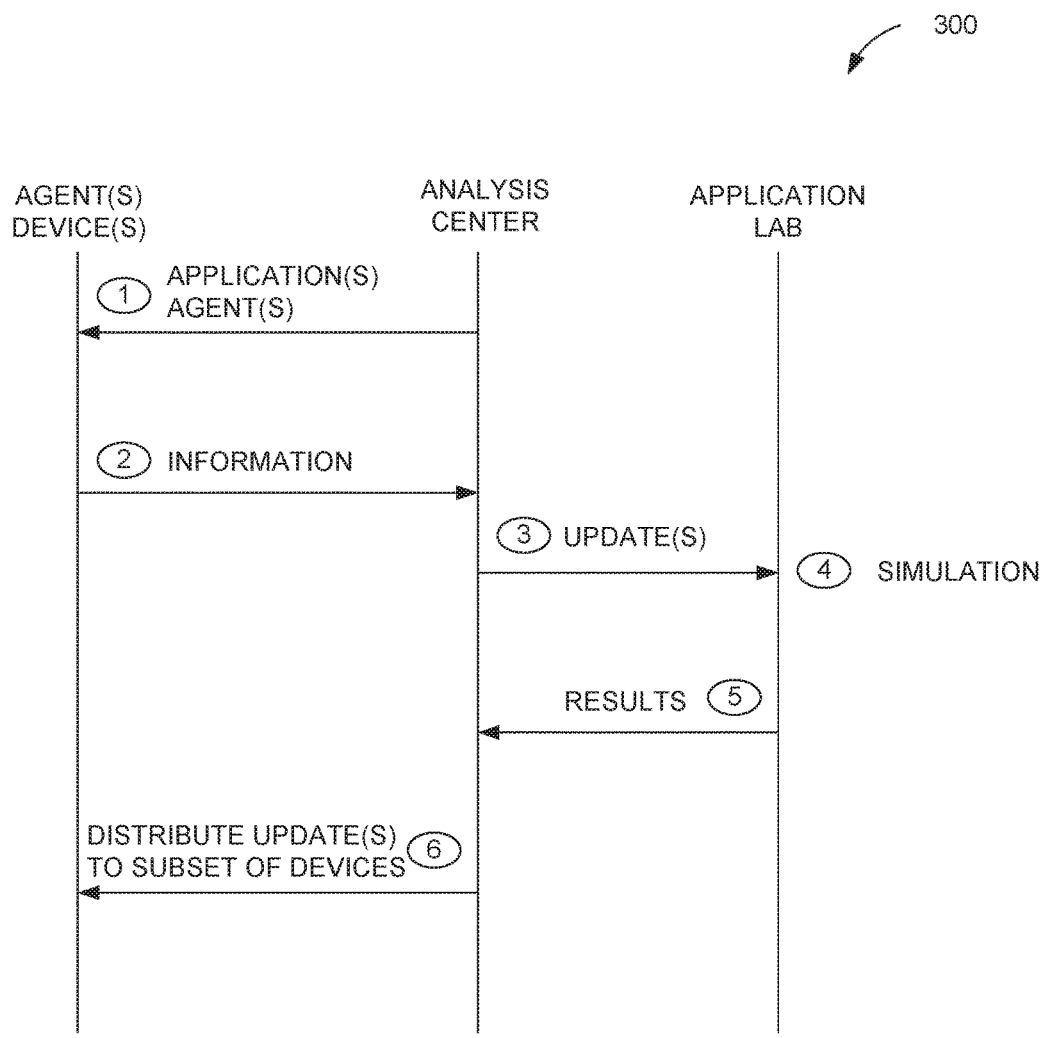
FIG. 3 illustrates a method for communicating an update to a subset of devices, in accordance with one embodiment.

FIG. 3 illustrates a method 300 for communicating an update to a subset of devices, in accordance with one embodiment. As an option, the method 300 may be implemented in the context of any one or more of the embodiments set forth in any previous and/or subsequent figure(s) and/or description thereof. For example, the method 300 may be implemented among the components of the system 200 of FIG. 2. However, it is to be appreciated that the method 300 may be implemented in the context of any desired environment.

As shown in step 1, one or more applications and one or more agents are distributed from an analysis center (e.g. analysis center 204 of FIG. 2, etc.) to a plurality of devices (e.g. devices 202A-E of FIG. 2, etc.). Next, information is gathered regarding the device (e.g. hardware, software, etc.), and the application(s) (e.g. the manner in which the user uses the application, and any issues/errors in operation of the application). See step 2. Examples of the manner in which the user uses the application may involve the identification of which features, options, etc. of the application that are actually used. Further, examples of the issues/errors in operation of the application may involve overload errors, errors resulting from deficient underlying hardware/software (e.g. screen resolution, network connection bandwidth, processing capacity, operating system limitations and compatibility issues, etc.).

Armed with such information, the analysis center, in connection with the development of updates, may cause the updates to be simulated on various combinations of devices that have different hardware and/or software, as well as different application usage patterns and errors. See steps 3-4. In one embodiment, such simulation may be carried out via an application lab (e.g. application lab 206 of FIG. 2, etc.). As mentioned earlier, the foregoing simulation may be carried out in response to the receipt of the information (for only those relevant combinations of parameters), or performed beforehand for the most prevalent/likely combination parameters (or even all combinations of parameters, in one embodiment).

Results of such simulation may thus be shared by the application lab with the analysis center. See step 5. To this end, a determination may be made by the analysis center as to which portion of the devices should receive the application update(s), based on the simulation. See step 6. For example, devices with certain hardware/software and/or application usage patterns/errors that exhibit a threshold of detrimental effects and/or a lack of utility (e.g. need for) the updates may be exempted from any distribution.

Figure 4A:
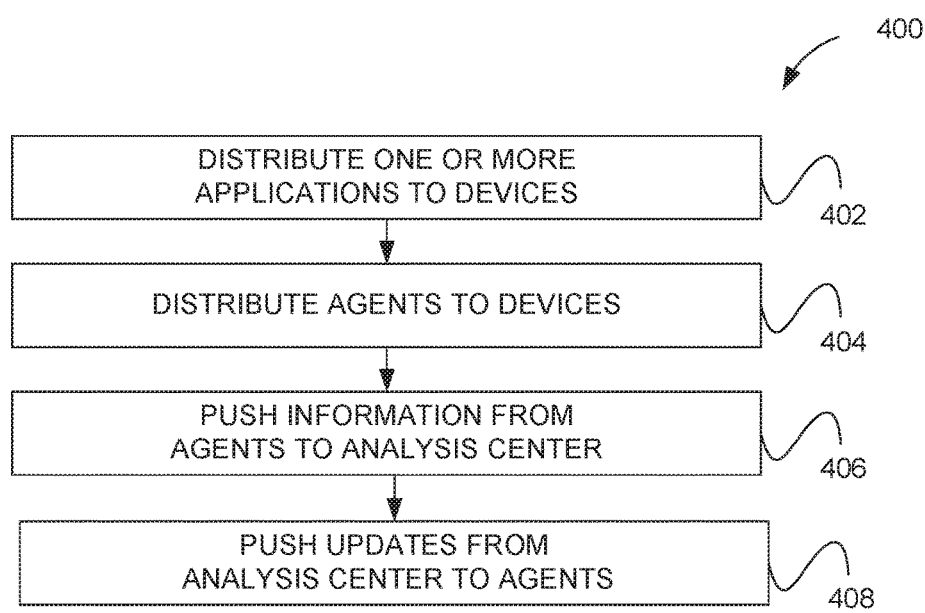
FIG. 4A illustrates an analysis center method for communicating an update to a subset of devices, in accordance with one embodiment.

FIG. 4A illustrates an analysis center method 400 for communicating an update to a subset of devices, in accordance with one embodiment. As an option, the method 400 may be implemented in the context of any one or more of the embodiments set forth in any previous and/or subsequent figure(s) and/or description thereof. For example, the method 400 may be implemented in the context of the analysis center 204 of the system 200 of FIG. 2. However, it is to be appreciated that the method 400 may be implemented in the context of any desired environment.

As shown, one or more applications are distributed to a plurality of devices (e.g. devices 202A-E, etc.) in operation 402. Separate from or in concert with the distribution of the one or more applications, agents may be distributed to the devices, as well. See operation 404.

Next, information is collected by the agents regarding the devices, the application, the user, etc. Further, such information is pushed by the agents to an analysis center (e.g. analysis center 204 of FIG. 2, etc.), per operation 406. In various embodiments, such push of information may occur periodically (based on a predetermined/configurable schedule, frequency, etc.), or may be pushed in response to any other manual and/or automated prompt. Further, such information may be used in connection with pushing updates from the analysis center to agents, per operation 408. More information will now be described regarding one possible way updates may be processed prior to distribution.

Figure 4B:
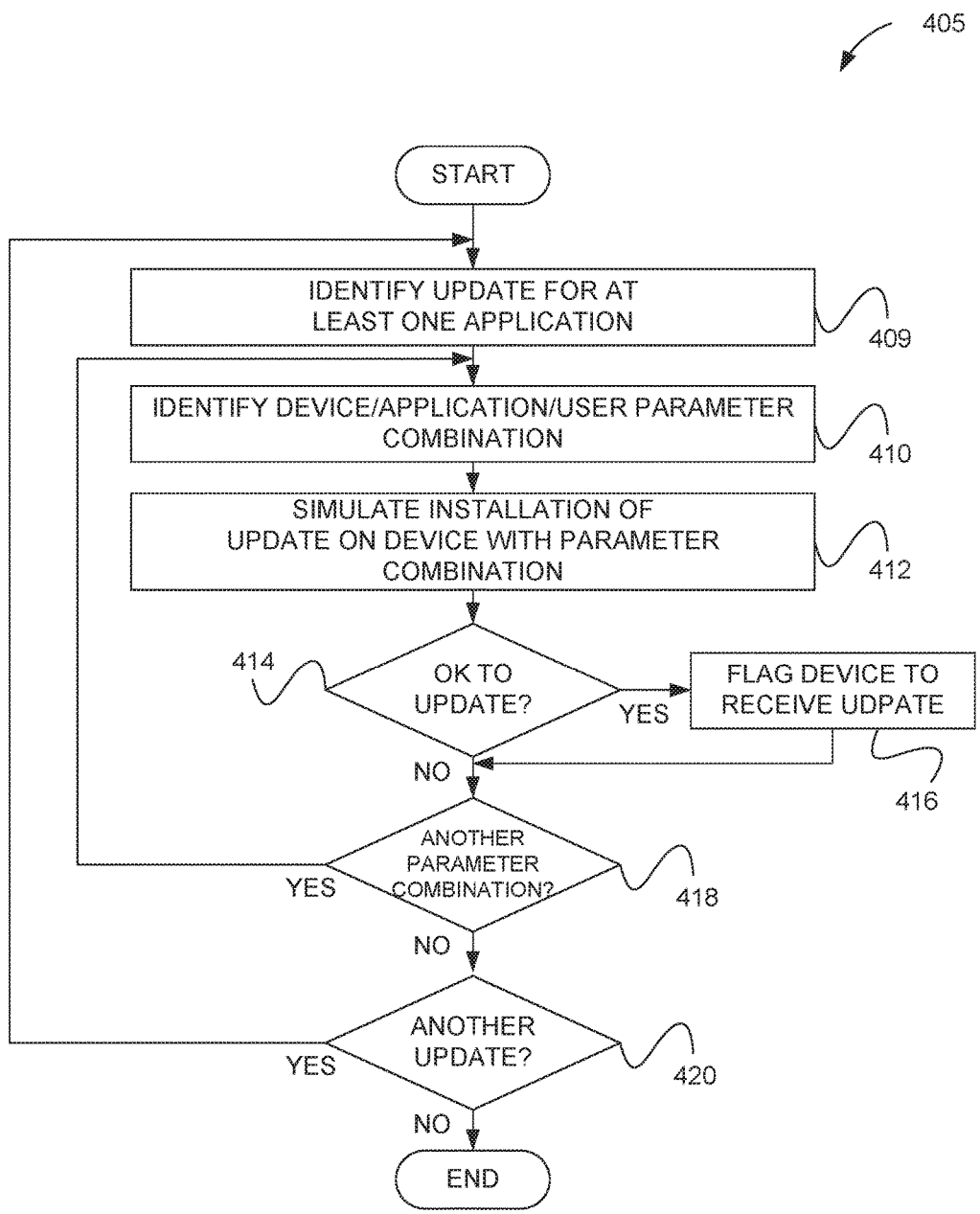
FIG. 4B illustrates a method for processing updates, in accordance with one embodiment.

FIG. 4B illustrates a method 405 for processing updates, in accordance with one embodiment. As an option, the method 405 may be implemented in the context of any one or more of the embodiments set forth in any previous and/or subsequent figure(s) and/or description thereof. For example, the method 405 may be implemented to process updates prior to distribution per the method 400 of FIG. 4A. However, it is to be appreciated that the method 405 may be implemented in the context of any desired environment.

In operation 409, an update is identified that has or has not been developed using the aforementioned information (and/or simulation). The method 400 then continues by identifying a particular combination of device/application/user parameters, per operation 410. In one embodiment, such particular combination of parameters may reflect one of the combinations represented by an actual one of the devices (via the collected information).

To this end, installation of the update on the device with the combination of parameters is simulated in operation 412. Based on such simulation and any identified positive utility (e.g. actual usage, existence of supporting hardware/software, etc.), and/or negative impact (e.g. errors, ineffective operation, etc.); it is decided (in decision 414) whether the update should be distributed to the device with the combination of parameters identified in operation 410.

For example, it may be determined if the update must be applied or not to devices matching identified characteristics. Such criteria may apply not only at a device category level, but with finer granularity considering both common (e.g. screen size, etc.) and specific characteristics to those devices categories (e.g. mobility, etc.). Still yet, it may be identified whether the update is mandatory or not, according to the way the end-user is practically using the application.

Thus, if it is decided that the update should be distributed to the device with the combination of parameters per decision 414, such device is flagged to receive the update in operation 416. The above method 400 is then repeated for each combination of parameters per decision 418, and is further repeated for each update per decision 420. It should be strongly noted that the foregoing method 400 is set forth for illustrative purposes only and should not be construed as limiting in any manner. For example, the simulation of operation 412 may, as mentioned earlier, be carried out before the receipt of the information in operation 406. Further, as also mentioned earlier, the simulation of operation 412 need not necessarily be performed for every single combination of parameters, etc.

FIG. 5 illustrates a table 500 showing exemplary logic for determining a subset of devices to receive an update, in accordance with one embodiment. As shown, a plurality of parameter-specific criteria are used to determine whether an update should be deployed to a particular device (or not). Still yet, a user experience impact parameter may be included to assess a net effect (on the user) of deploying the update (or not).

A system, computer program, and method are thus provided for selective deployment of software updates to client multi-channel applications installed on a wide range of devices of any type. This is accomplished by allowing a collection of data from application and devices using an agent that is either part of the application or provided as a standalone agent covering a group of applications. The agent collects device settings, configuration, and usage pattern information and transmits the same to a data center for analysis, which is performed either manually by the application team or by automatic algorithms. Such analysis results in a profiling of the end-users and their devices to allow manual and/or automatic decision-making regarding a deployment of software updates to the end-user meant to fix or enhance capabilities of the client application.

The deployment may thus be effected only to the selected end-user devices which fit a profile for which the software update is applicable. As an option, a logical or physical lab may be provided to simulate, by minimal settings, all user application patterns (e.g. version and applied updates) created by the selective deployment on all device patterns used by real end-users. In one embodiment, this may enable architects and developers to experience firsthand an end-user experience of a behavior, as illustrated for all different user profiles of real end-users.

For example, some typical updates may make sense only for certain versions of an OS, such as features that can only be granted starting from a given (minimal) version, or, at an opposite end of the spectrum, that only need to fix something below a certain version of an OS. Applying an update to fix a given version can sometimes break features on other versions if also applied on top of them. Further, some typical updates relating to application display (e.g. layout, responsiveness, etc.) can make sense only for certain ranges of screen resolution or densities. Applying an update to fix a given version can actually detrimentally affect a display of other versions, when applied on top of them.

In addition, not all updates actually address an entire application experience, but can eventually either fix or improve specific services offered within the application (e.g. specific sections, features, etc.). Use, or non-use, of such services depends not only on the used device, but also on the end-user themselves. In other words, such aspects may relate to a personal way of using an application (i.e. usage, etc.), what the user has activated, user habits, user expectations, user needs, etc. For example, this can be set according to an application configuration as defined by the end-user, or the end-user's account that can grant only part of the application services. Providing risky updates to an application to fix unused services can thus be avoided to keep mass market engaged end-users with a non-deceptive experience.

Thus, in one or more of the embodiments described herein, various features or benefits may or may not be afforded including, but not limited to those set forth in Table 2.

TABLE 2

Figure 6:
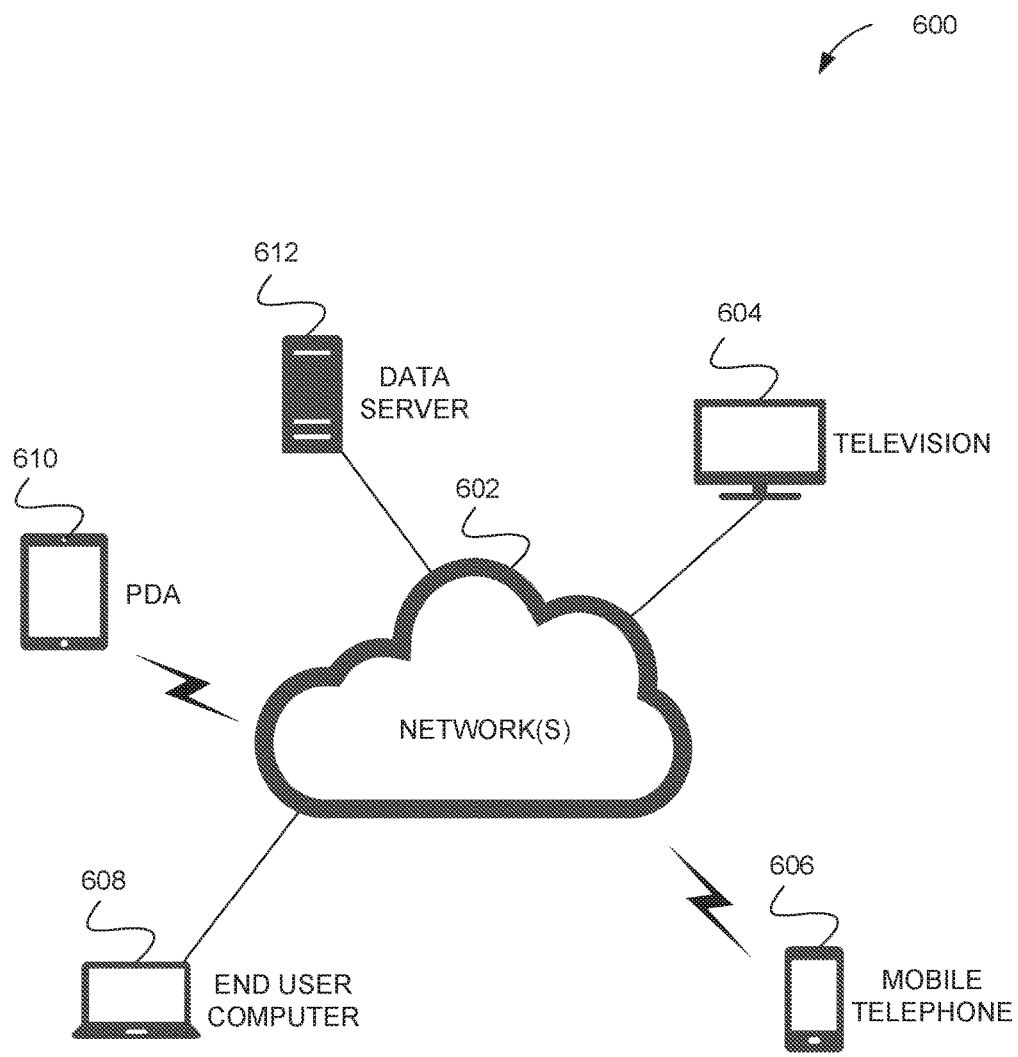
FIG. 6 illustrates a network architecture, in accordance with one embodiment.

Lean client side application containing only what the user requires
Stable ongoing user experience
Reduction in interruption to the user by unneeded software updates
Reduced risk from regression issues post deployment
Shortened error analysis using a data center to analyze impacted population and root cause
Shortened time to value using a lab to quickly configure and test fixes
Increase in value of new development using a data center to analyze end-users' needs FIG. 6 illustrates a network architecture 600, in accordance with one embodiment. As shown, at least one network 602 is provided. In one embodiment, any one or more of the devices on the at least one network 602 may incorporate an agent or analysis center, for use in communicating information/updates in accordance with any embodiment described in reference to the previous figures.

In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 612 and an end user computer 608 may be coupled to the network 602 for communication purposes. Such end user computer 608 may include a desktop computer, lap-top computer, and/or any other type of logic. Still yet, various other devices may be coupled to the network 602 including a personal digital assistant (PDA) device 610, a mobile phone device 606, a television 604, etc.

Figure 7:
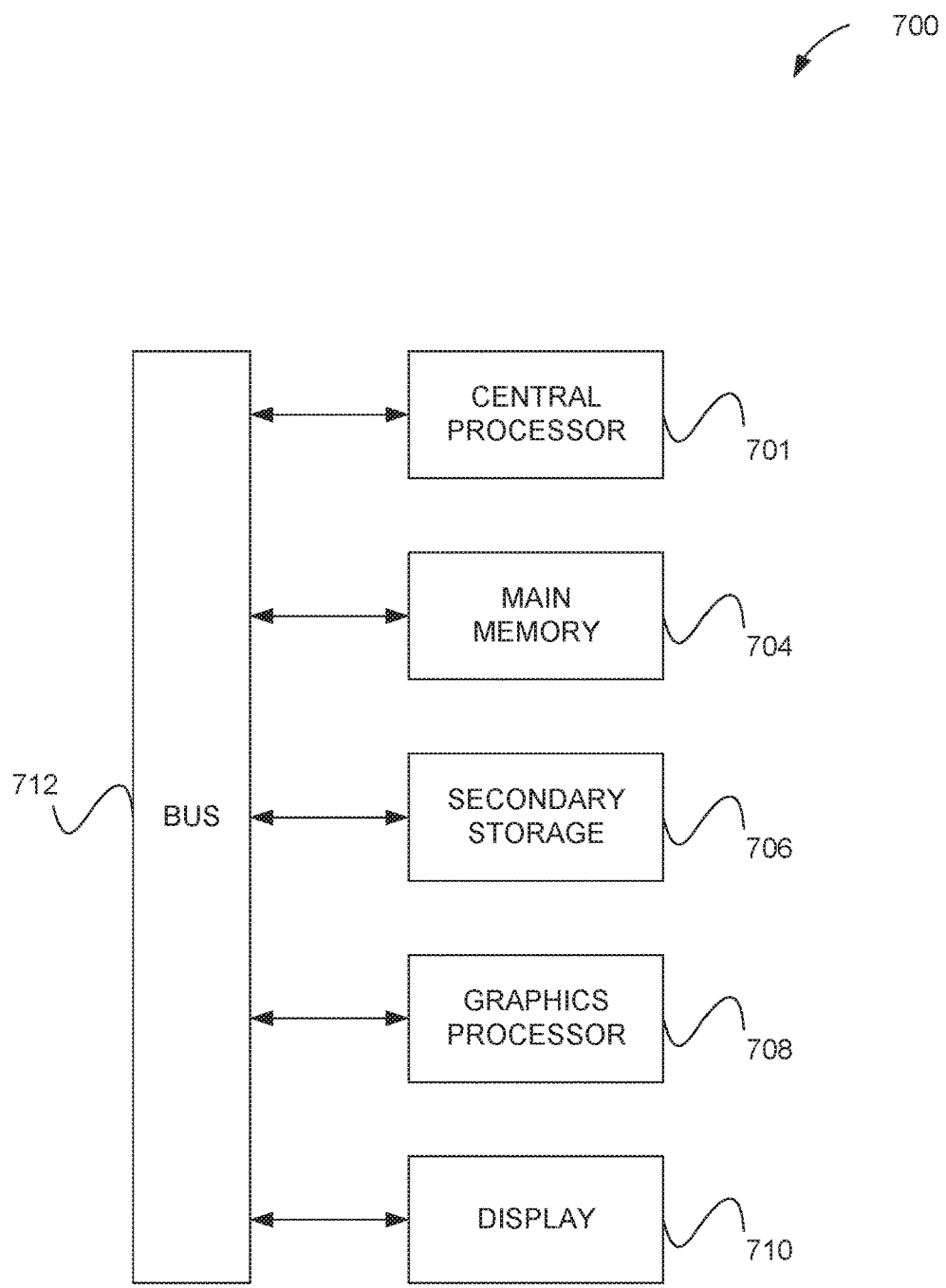
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. However, it is to be appreciated that the system 700 may be implemented in any desired environment.

As shown, a system 700 is provided including at least one central processor 702 which is connected to a bus 712. The system 700 also includes main memory 704 [e.g., hard disk drive, solid state drive, random access memory (RAM), etc.]. The system 700 also includes a graphics processor 708 and a display 710.

The system 700 may also include a secondary storage 706. The secondary storage 706 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 706, and/or any other memory, for that matter. Such computer programs, when executed, enable the system 700 to perform various functions (as set forth above, for example). Memory 704, secondary storage 706 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A non-transitory computer readable medium storing computer executable instructions executable by a processor to perform a method comprising:
   receiving application usage information associated with each device of a plurality of devices for an application installed thereon, the application usage information, which is selectively collected by an agent covering a group of applications, including:
   identification of features of the application that are used by a user of the device,
   errors in operation of the application on the device,
   different application usage patterns, and
   errors regarding software and hardware of the plurality of devices;
   identifying an update for the application;
   simulating, via at least one virtual device, each device of the plurality of devices to have the update for the application installed thereon;
   testing, on the at least one virtual device, various types of usage of the application having the update;
   determining, from the testing, one or more of the various types of usage of the application that each do not exhibit a threshold of detrimental effects and do not exhibit a lack of utility for the update;
   defining applicability criteria for the update that indicates that the update is applicable to the determined one or more of the various types of usage of the application;
   determining, from the application usage information received for the plurality of devices, a subset of the plurality of devices associated with application usage information that exhibits the one or more of the various types of usage of the application indicated by the applicability criteria defined for the update; and
   responsive to determining the subset of the plurality of devices, causing the update for the application to be installed on each device in the subset of the plurality of devices by only distributing the update to the determined subset of the plurality of devices.

2. The non-transitory computer readable medium of claim 1, wherein the application usage information further includes one or more configuration settings of the application.

3. The non-transitory computer readable medium of claim 1, wherein the application usage information is received from at least one agent installed on each of the plurality of devices, and the update is communicated to the at least one agent installed on each of the subset of the plurality of devices.

4. The non-transitory computer readable medium of claim 1, wherein the errors in operation of the application on the device include:
   overload errors, and
   errors resulting from deficient underlying hardware and software of the device, including screen resolution, network connection bandwidth, processing capacity, operating system limitations, and compatibility issues.

5. A method, comprising:
   receiving, utilizing at least one interface of a computer system, application usage information associated with each device of a plurality of devices for an application installed thereon, the application usage information, which is selectively collected by an agent covering a group of applications, including:
   identification of features of the application that are used by a user of the device,
   errors in operation of the application on the device;
   different application usage patterns, and
   errors regarding software and hardware of the plurality of devices;
   identifying, by the computer system, an update for the application;
   simulating, by the computer system via at least one virtual device, each device of the plurality of devices to have the update for the application installed thereon;
   testing, by the computer system on the at least one virtual device, various types of usage of the application having the update;
   determining, by the computer system from the testing, one or more of the various types of usage of the application that each do not exhibit a threshold of detrimental effects and do not exhibit a lack of utility for the update;
   defining, by the computer system, applicability criteria for the update that indicates that the update is applicable to the determined one or more of the various types of usage of the application;
   determining, by the computer system from the application usage information received for the plurality of devices, a subset of the plurality of devices associated with application usage information that exhibits the one or more of the various types of usage of the application indicated by the applicability criteria defined for the update; and
   responsive to determining the subset of the plurality of devices, causing, utilizing the at least one interface of the computer system, the update for the application to be installed on each device in the subset of the plurality of devices by only distributing the update to the determined subset of the plurality of devices.

6. An apparatus, comprising: a memory and
   at least one server computer comprising a processor configured to:
   receive application usage information associated with each device of a plurality of devices for an application installed thereon, the application usage information, which is selectively collected by an agent covering a group of applications, including:
   identification of features of the application that are used by a user of the device,
   errors in operation of the application on the device;
   different application usage patterns, and
   errors regarding software and hardware of the plurality of devices;
   identify an update for the application;
   simulate, via at least one virtual device, each device of the plurality of devices to have the update for the application installed thereon;
   test, on the at least one virtual device, various types of usage of the application having the update;
   determine, from the testing, one or more of the various types of usage of the application that each do not exhibit a threshold of detrimental effects and do not exhibit a lack of utility for the update;
   define applicability criteria for the update that indicates that the update is applicable to the determined one or more of the various types of usage of the application;
   determine, from the application usage information received for the plurality of devices, a subset of the plurality of devices associated with application usage information that exhibits the one or more of the various types of usage of the application indicated by the applicability criteria defined for the update; and
   responsive to determining the subset of the plurality of devices, cause the update for the application to be installed on each device in the subset of the plurality of devices by only distributing the update to the determined subset of the plurality of devices.

\* \* \* \* \*